Patented Jan. 22, 1946

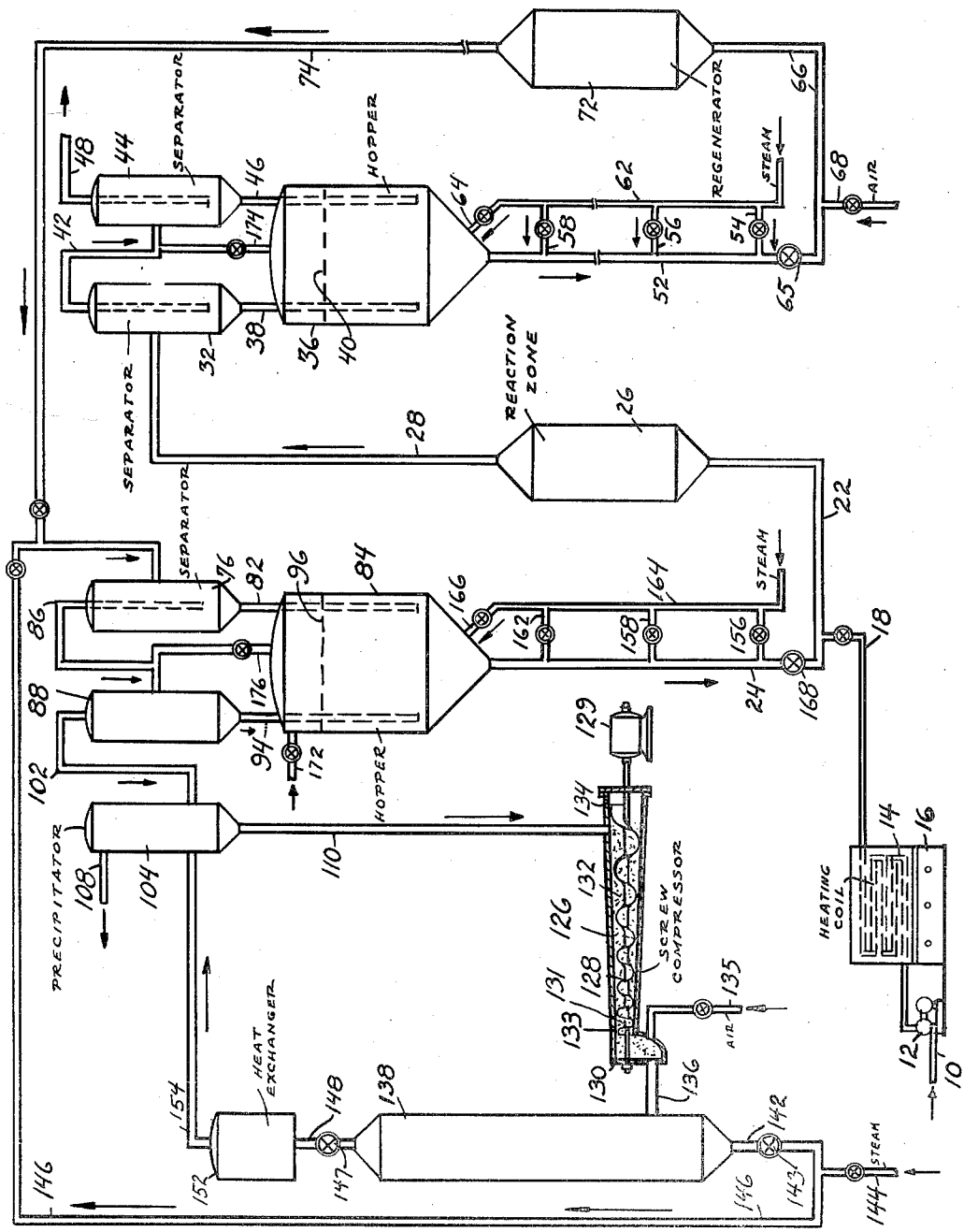

2,393,554

UNITED STATES PATENT OFFICE 2,393,554

RECOVERING CATALYST MATERIAL

Henry J. Ogorzaly, Baton Rouge, La., assignor to Standard Oil Development Company, a corporation of Delaware Application August 1, 1941, Serial No. 404,993

10 Claims. (Cl. 196—52)

This invention relates to catalytic conversion of hydrocarbons and more particularly relates to recovering and recirculating catalyst fines which are difficult to recover from vapors and gases.

In the catalytic conversion of hydrocarbons where powdered catalyst material is mixed with hydrocarbon vapors to form a suspension and the suspension is passed through pipes, reaction zone, separators and other equipment it has been noticed that there is considerable attrition of the catalyst particles. For example, if a conversion operation is started with powdered catalytic material or finely divided catalyst material having a small percent of exceedingly fine particles, it has been found that the catalyst particles are broken down and the catalytic powdered material after having gone through the equipment one or more times has a very large percentage of exceedingly fine particles which are difficult to recover in the usual separating equipment.

When these particles become very small, a large part of them is lost with the outgoing regeneration gases and product vapors unless expensive separating means are used. The catalyst fines may be recovered with better equipment but they are not as easy to handle as the larger catalyst particles as they tend to bridge in parts of the equipment and they do not have the desirable flow characteristics which are inherent in the larger catalyst particles.

If the catalyst fines are recovered and returned to the unit, the recycling of the catalyst fines would greatly increase the load on the catalyst recovery units and also would result in a higher concentration of the catalyst fines in the circulating catalyst stream, which would then have an increased tendency to bridge, and which would have poorer flow characteristics than a catalyst stream containing larger amounts of larger catalyst particles.

According to my invention, the very small catalyst particles or catalyst fines recovered from the gases and/or vapors are agglomerated to form larger catalyst particles which are then returned to the hopper which feeds the powdered catalyst to the conversion zone. The extremely fine catalyst particles or catalyst fines are preferably separated from the regeneration gases in a last stage separator such as an electrostatic precipitator but the catalyst fines may also be separated from the vaporous products of reaction in a similar last stage separator and treated according to my invention.

In the drawing the figure represents one form of apparatus which may be used in carrying out my invention.

Referring now to the drawing, the reference character 10 designates a line through which hydrocarbons are pumped by means of pump 12. The hydrocarbons may be any suitable cracking stock such as gas oil. However, my invention is not to be restricted to catalytic cracking as other conversion operations using pulverulent catalysts may be practiced according to my invention.

The hydrocarbon oil from line 10 is passed through a suitable heating coil 14 in a heater 16 to vaporize the oil and to raise it to the desired conversion temperature. The hydrocarbon vapors are passed through line 18 and into line 22 where they are mixed with powdered catalyst introduced into line 22 from standpipe 24 which will be later described in greater detail. For catalytic cracking the catalyst may comprise acid treated bentonite clays, synthetic gel catalysts containing silica and alumina, or other suitable catalysts may be used. The catalyst powder consists of particles which are preferably smaller than 60 to 80 mesh in size and preferably contain less than about 50% by weight of the particles smaller than 20 microns in diameter.

The mixture of catalyst particles and vapors is then passed upwardly through an enlarged reaction zone or chamber 26 and is maintained in the reaction zone for the desired time to effect the desired extent of conversion. It will be seen that the reaction zone 26 has a much larger diameter than the inlet pipe 22 and because of this increased cross-sectional area there is a reduction in the velocity of the mixture of catalyst and oil vapors passing through the reaction zone. As a result of the reduction in velocity and the tendency of the solid particles to settle out from suspension in the vapors, the concentration of the catalyst in the reaction zone is much greater than in inlet pipe 22 and a fluidized mass is obtained. Because of the jet-type action of the inlet stream and the upward flow of vapors through the mass of the catalyst held in the reaction zone, an extremely turbulent condition exists, intimate contact between the catalyst particles and reactants is maintained in the reaction zone or chamber 26 and a substantially uniform temperature prevails.

The products of reaction and the powdered catalyst leave the top of the reaction zone 26 and pass through line 28 to a separating means 32 for separating catalyst particles from the reaction products in vapor form. Any suitable separating means may be used but preferably a cyclone separator is used. A large percentage of the catalyst particles is separated from the vapors in the first separating means 32 and dropped into the hopper 36 by means of line 38. Preferably the line 38 extends below the level 40 of the catalyst particles in the hopper 36.

The separated vapors pass overhead through line 42 from the separating means 32 and are introduced into a second separating means 44 shown in the drawing as a cyclone separator. An additional quantity of powdered catalyst is separated from the vaporous products of reaction and is passed through line 46 into the catalyst hopper 36 below the level 40 of catalyst particles therein. The catalyst particles separated in the second separating means 44 are of a smaller average size than the particles separated in the first separating means 32.

The separated vaporous products of reaction pass overhead through line 48 and are preferably passed to a fractionating system (not shown) to separate a desired motor fuel containing gasoline constituents from condensate oil. These vapors passing through line 48 still contain a small percentage of catalyst fines and if desired, they may be separated by passing the vapors and gases through additional separating means and these catalyst fines may be treated according to my invention to agglomerate them and make larger catalyst particles as will be hereinafter described in connection with the catalyst fines recovered from regeneration gases. The catalyst fines in the vapor line 48 are not lost as they are recovered with the condensate oil in the fractionating system and may be recovered from the condensate oil or the condensate oil with the catalyst fines may be recycled through the heating coil 14 and through the reaction zone.

The catalyst particles recovered after a conversion operation and collected in the main catalyst hopper 36 are contaminated with carbonaceous deposits and it is desirable to regenerate them before reusing them in another conversion operation. During regeneration, it is important to maintain the temperature at a level which will avoid overheating and sintering of the catalyst particles.

The contaminated catalyst particles are withdrawn from the bottom of the catalyst hopper 36 through standpipe 52 in which the catalyst particles are fluidized or aerated by the introduction of a suitable gas such as steam. The steam or other suitable gas is introduced into the standpipe 52 at one or more spaced points by lines 54, 56 and 58 which are fed from a manifold 62. The bottom of the hopper 36 is also preferably fluidized by the introduction of steam or other suitable gas through line 64. Sufficient amounts of gas are introduced into the hopper and standpipe 52 to make the catalyst particles flow as a liquid but the addition of too much gas is avoided as this would decrease the density of the catalyst column in the standpipe.

The standpipe 52 is of a sufficient height to provide a head of pressure at the bottom of the standpipe similar to a head of pressure produced by a column of liquid so as to force the catalyst particles through the regeneration system as will be presently described. Preferably the bottom of the standpipe 52 is provided with a valve 65 which may be manually or automatically operated to control the amount of catalyst fed from the bottom of the standpipe 52.

The fluidized contaminated catalyst particles are then passed through line 66 into which an oxidizing agent such as air is introduced through line 68 to burn off the carbonaceous deposits from the catalyst particles. The gaseous suspension of catalyst particles is then passed through a regeneration zone or chamber 72 which is similar in construction to the reaction zone 26. The suspension is introduced into the bottom portion of the regeneration zone 72 and due to the enlarged cross-section of the regeneration zone there is a reduction in the velocity of the suspension and the concentration of the catalyst particles in the regeneration zone is greater than that in the inlet line 66.

During regeneration, the air burns off the carbonaceous deposit and due to the exothermic reaction there is a rise in temperature. Preferably suitable cooling means is provided for preventing too great a rise in the temperature of the catalyst particles undergoing regeneration. Where an acid treated bentonite clay is used as the catalyst, it is preferable to maintain the regeneration temperature below about 1050° F. However, if more rugged catalysts are used higher regeneration temperatures may be tolerated.

The regenerated catalyst particles and regeneration gases leave the top of the regeneration zone 72 through line 74 and are introduced into a first separating means 76 for separating regenerated catalyst particles from regeneration gases. Any suitable separating means may be used but a cyclone separator such as shown in the drawing is preferably used. In the first separating means 76 a large percentage of the catalyst particles is removed from the regeneration gases and the portion removed contains the larger catalyst particles. The separated catalyst particles are withdrawn through line 82 and introduced into a regenerated catalyst hopper 84.

The regeneration gases separated in the first separating means 76 still contain catalyst particles and are passed through line 86 to a second separating means 88 which is shown as a cyclone separator. In the second separating means 88 an additional quantity of regenerated catalyst particles is separated and this portion contains smaller catalyst particles than those separated in the first separating means 76. The separated catalyst particles are passed through line 94 to the regenerated catalyst hopper 84. Preferably the lines 82 and 94 extend below the level 96 of the catalyst particles in the hopper 84.

The separated regeneration gases leave the top of the second separating means 88 through line 102 and as they still contain small amounts of fine catalyst material they are preferably introduced into a third separating means which is preferably an electrostatic precipitator 104. In the electrostatic precipitator the catalyst fines are separated from regeneration gases and are withdrawn therefrom. The regeneration gases are vented to the atmosphere through line 108. The catalyst fines are withdrawn from the precipitator 104 through line 110 and are introduced into a screw compressor 126 in order to agglomerate the catalyst fines and to make larger catalyst particles.

In passing through the conversion apparatus the catalyst originally introduced into the system is broken down and a relatively large amount of exceedingly fine catalyst particles is formed. If these catalyst fines which are separated in the separating means 104 were returned to the conversion system as such they would increase the load on the separating means in subsequent cycles and the concentration of the catalyst fines in the system would increase. Due to the increase in the catalyst fines there would be a greater loss of catalyst material to the atmosphere unless additional separating means were introduced. In order to overcome the objection of having too much catalyst fines, my invention treats these catalyst fines to agglomerate them and to make larger catalyst particles which are then reintroduced into the conversion system.

The catalyst fines entering the electrostatic precipitator 104 are at a temperature of about 900° F. to 1000° F. and may be cooled to a temperature not less than about 600° F. before being introduced into the screw compressor 126. The temperature of the catalyst fines is preferably between about 800° F. and 900° F. when the catalyst comprises acid treated bentonite clays. Different temperatures may be used with different catalytic materials.

The screw compressor 126 is provided with a compression screw 128 which is rotated by means of a motor 129 or other means. It should be operated at relatively high speed, for example from 1000 to 4000 revolutions per minute. In order to obtain the proper compressive action the screw should be constructed with the distance between flights decreasing toward the outlet end 130 of the screw. From the drawing it will be seen that the distance 131 between flights of the screw 128 near the outlet end is much smaller than the distance 132 between flights of the screw 128 near the inlet end of the screw compressor 126. Also the diameter of the barrel and the diameter of the flights may be decreased toward the outlet end 130 in order to further increase the compressive action. In the drawing the diameter 133 of the barrel at the outlet end 130 of the screw compressor 126 is smaller than the diameter 134 near the inlet end.

In passing through the compression screw the hot catalyst fines are subjected to extremely high local pressures as they are moved along toward the outlet end 130 of the compression screw, which discharges against a substantial pressure differential of the order of 10 to 40 pounds per square inch. During this compression at a relatively high temperature larger catalyst particles are formed and the compressed catalyst particles from the outlet end 130 are mixed with a suitable gas such as air introduced at 135 to form a suspension and are then passed through line 136 to a separating means 138 for separating larger catalyst particles from catalyst fines. The separating means 138 comprises a vertically arranged elongated vessel or elutriator in which the larger particles fall to the bottom of the vessel and catalyst fines and air or other gas are passed overhead. The amount of air introduced at 135 is so controlled as to separate particles having a size greater than about 20 microns.

The larger particles are withdrawn from the bottom of the vessel 138 through line 142 at a rate controlled by valve 143 and are mixed with steam or air introduced through line 144. The suspension is returned to cyclone 76 through line 146 after joining with the stream carried in line 74.

The catalyst fines which were not agglomerated during passage through the compression screw 126 pass overhead from the vessel 138 through valve 147 and line 148 and through heat exchanger 152 and then pass through line 154 into the electrostatic precipitator 104 for the further separation of catalyst fines from the gas. These fines are then again passed through the compression screw 126 for further treatment. The temperature of the catalyst fines returned to the electrostatic precipitator 104 may be controlled by heat exchanger 152 to give the desired temperature in line 110 discharging into screw compressor 126.

Returning now to the standpipe 24, it will be seen that the regenerated catalyst from the hopper 84 is introduced into the top of standpipe 24. The regenerated catalyst in the standpipe 24 is fluidized by the introduction of steam or other suitable gas through spaced lines 156, 158 and 162 which are fed from a manifold 164. Preferably the bottom of the hopper 84 is also fluidized by the introduction of steam or other suitable gas through line 166. Sufficient amounts of gas are introduced into the standpipe and hopper to provide a fluidized material which flows similarly to a liquid. The fluidized column in the standpipe 24 is of a sufficient height to provide a sufficient pressure for forcing the catalyst particles through the reaction zone 26 and associated parts of the conversion unit. The bottom of the standpipe 24 is provided with a valve 168 which may be manually or automatically operated to control the amount of catalyst being introduced into line 22 for admixture with the hydrocarbon or other vapors to be converted.

Fresh catalyst is preferably introduced into the regenerated catalyst hopper 84 through line 172. The fresh catalyst introduced into the hopper 84 is preferably of a size of about 5 microns to 60 mesh.

Due to the introduction of gases into standpipes 24 and 52 and the hoppers 36 and 84 there is an accumulation of gas in the top of the hoppers and draw-off lines may be provided for removing these gases from the hoppers. Line 174 connects the top of hopper 36 with the line 42 passing to the second separating means 44 and line 176 connects the top of regenerated catalyst hopper 84 with the line 86 passing to the second separating means 88.

Instead of agglomerating only the fines it is also possible to install a compression screw in parallel with the standpipe 24 so that the process would be operated using the standpipe until the concentration of catalyst fines built up to a certain amount. All of the catalyst including the larger particles and fines would then be fed through a compression screw to form agglomerates and the process operated for a while with the screw instead of the standpipe or in addition to the standpipe. When the catalyst fines concentration is reduced, the stream can be switched back to the standpipe or the compression screw cut out.

Or, the compression screw could be installed to operate intermittently in series with the standpipe, rather than in parallel, if desired. The compression screw may be installed in the regenerated catalyst stream or in the spent catalyst stream before the addition of regenerating gas.

While I have shown a compression screw as one means for agglomerating the catalyst fines, it is to be understood that my invention is not to be limited thereto as other means of agglomerating the catalyst fines may be used, and any apparatus which will subject the catalyst particles to high localized pressure at elevated temperatures will accomplish the desired result.

I claim:

1. In a process of catalytically converting hydrocarbons wherein heated hydrocarbon vapors and powdered catalyst are passed through a reaction zone to effect the desired extent of conversion and the powdered catalyst is then separated from the vaporous reaction products and regenerated and the regenerated catalyst particles are separated from regeneration gases, the steps of separating catalyst fines from the coarser catalyst particles and agglomerating them to form larger attrition resistant catalyst particles which are returned to the reaction zone.

2. In a process of catalytically converting hydrocarbons wherein heated hydrocarbon vapors and powdered catalyst are passed through a reaction zone to effect the desired extent of conversion and the powdered catalyst is then separated from the vaporous reaction products and regenerated and the regenerated catalyst particles are separated from regeneration gases and there is accumulation of catalyst fines during the process, the steps of removing catalyst fines from the coarser catalyst, agglomerating the catalyst fines to form larger catalyst particles and separating the larger agglomerated catalyst particles from unagglomerated catalyst fines and returning the agglomerated catalyst particles to the reaction zone.

3. In a process according to claim 2 wherein the unagglomerated fines are recycled to the agglomeration step.

4. In a process according to claim 2 wherein the separated larger agglomerated catalyst particles are returned to said reaction zone.

5. In a process of catalytically converting hydrocarbons wherein heated hydrocarbon vapors and powdered catalyst are passed through a reaction zone to effect the desired extent of conversion and the powdered catalyst is then separated from the vaporous reaction products and regenerated and the regenerated catalyst particles are separated from regeneration gases, the steps of separating catalyst fines from the coarser catalyst agglomerating them under an elevated temperature and under superatmospheric pressure to form larger attrition resistant catalyst particles and returning the agglomerated catalyst particles to the reaction zone.

6. In a chemical process wherein powdered catalyst is passed as a suspension through equipment during the operation of the process and some of the catalyst particles are broken down by attrition to exceedingly fine catalyst particles which are difficult to handle and recover and the catalyst particles are then separated from the suspension into masses of relatively larger and relatively smaller sized particles in a plurality of stages, the step of forming larger attrition resistant catalyst particles from the fine catalyst particles separated in the last stage and returning said attrition-resistant catalyst particles to the process.

7. In a method according to claim 6 wherein the fine catalyst particles are treated under elevated temperature and superatmospheric pressure to form the larger catalyst particles.

8. In the regeneration of catalyst particles contaminated with carbonaceous material wherein a suspension of the catalyst particles in a gas containing air is passed through a regeneration zone and the regenerated catalyst particles are separated from the regeneration gases into masses of relatively larger and relatively smaller sized particles in a plurality of stages, the steps of agglomerating the fine catalyst particles from the last stage to form larger attrition resistant catalyst particles and mixing the agglomerated catalyst particles with the regenerated catalyst from the first stages.

9. In the regeneration of catalyst particles contaminated with carbonaceous material wherein a suspension of the catalyst particles in a gas containing free oxygen is passed through a regeneration zone and the regenerated catalyst particles are separated from the regeneration gases, the steps of removing catalyst fines from the coarser regenerated catalyst, agglomerating the catalyst fines to form larger catalyst particles and returning the larger agglomerated particles to the regenerated catalyst.

10. A process for agglomerating catalyst fines which comprises feeding catalyst fines through a high speed compression-type screw at a temperature of about 600° F. to 1000° F. and against a pressure differential of 10 to 60 pounds per square inch.

HENRY J. OGORZALY.